(12) United States Patent
Tokiwa

(10) Patent No.: US 6,247,999 B1
(45) Date of Patent: Jun. 19, 2001

(54) METHOD FOR AUTOMATICALLY EXCHANGING POLISHING TOOLS IN MOLD POLISHING DEVICE

(75) Inventor: Susumu Tokiwa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/245,908

(22) Filed: Feb. 8, 1999

(30) Foreign Application Priority Data

Feb. 13, 1998 (JP) .................................................. 10-030920

(51) Int. Cl.⁷ .............................. B24B 49/00; B24B 51/00
(52) U.S. Cl. .................................. 451/8; 451/57; 451/65; 483/33; 483/54
(58) Field of Search .................................. 451/8, 28, 342, 451/57, 65; 483/33, 54

(56) References Cited

U.S. PATENT DOCUMENTS 4,551,902 * 11/1985 Thibaut .
5,287,658 * 2/1994 Attanasio .
5,478,271 * 12/1995 Thibaut ................................ 451/342
6,059,702 * 5/2000 Winkler et al. ......................... 483/13

* cited by examiner

*Primary Examiner*—Timothy V. Eley
(74) *Attorney, Agent, or Firm*—Sughrue, Mion, Zinn, Macpeak & Seas, PLLC

(57) ABSTRACT

A mechanism and a method for automatically exchanging polishing tools in a mold polishing device. A polishing tool, which is mounted on a spindle of an arm of a robot, is pressed onto and displaced along the work surface to polish the same. A T-shaped holder is provided at a leading end portion of the spindle, and the polishing tool is provided with a pair of notches that allow a pair of latch pins to be press-fitted thereinto and forcibly withdrawn therefrom. A tool stand and a tool removal stand are provided in the vicinity of the mold setting area. A plurality of polishing tools are disposed on the tool stand. A horizontal slot of a narrow width that allows passage of the latch pins is formed in the tool removal stand. The arm, together with the holder, is raised such that the latch pins pass upward through the slot of the tool removal stand. The polishing tool is thereby removed from the holder. Thereafter, the arm and the holder are lowered from above towards another polishing tool so as to mount the polishing tool on the holder.

4 Claims, 11 Drawing Sheets

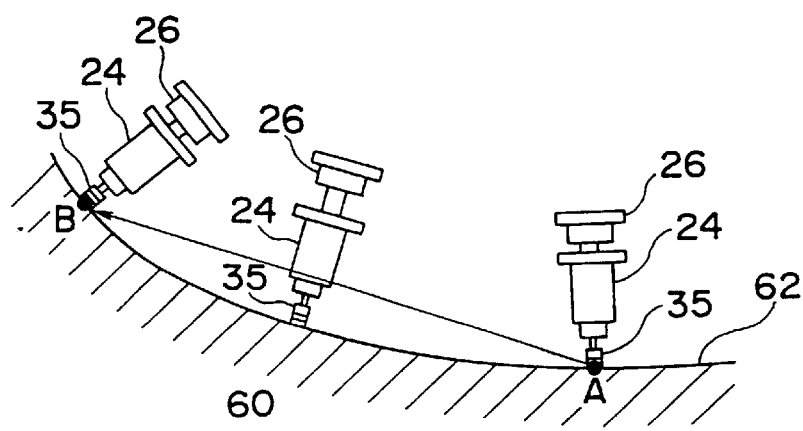
Fig. 4
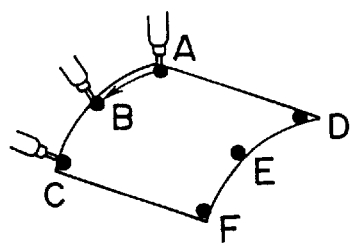
Fig. 5
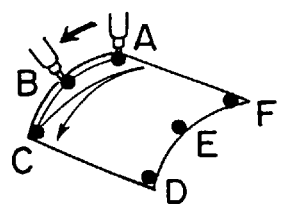 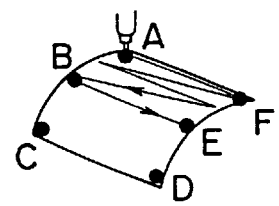
Fig. 6(a)  Fig. 6(b)

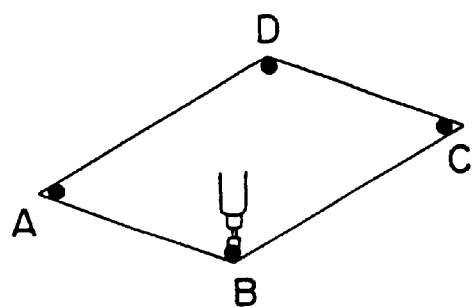
Fig. 7
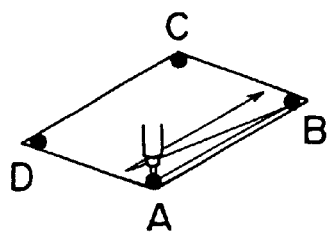 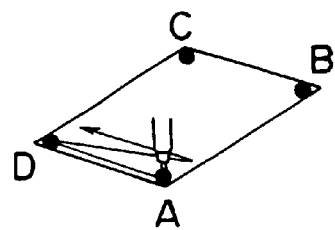
Fig. 8(a)  Fig. 8(b)

METHOD FOR AUTOMATICALLY EXCHANGING POLISHING TOOLS IN MOLD POLISHING DEVICE

FIELD OF THE INVENTION

A synthetic resin component of a vehicular lighting fixture, such as a lamp body or a front lens, is generally formed using a mold. The present invention relates to a mechanism and a method for automatically exchanging polishing tools in a mold polishing device used to polish a mold, particularly a molding surface or a parting surface of a mold, which is used for forming a synthetic resin product such as a lamp body or a front lens.

BACKGROUND OF THE INVENTION

In order to produce a mold for forming a synthetic resin product such as a lamp body or a front lens, the mold is first cut or cast into a predetermined shape, and a molding surface or a parting surface of the mold is then subjected to electric spark machining. Finally, a polishing tool is used to mirror-finish the molding surface or the parting surface. Although a polishing process using a polishing tool may be performed manually, a great deal of skill is required to properly flat-finish a work surface. Moreover, such a polishing process requires time-consuming operations. Therefore, a polishing robot has recently been employed to enhance polishing precision and reduce the time required for the polishing process.

More specifically, a polishing tool is mounted on a spindle at a leading end of an arm of the polishing robot. The polishing tool is set in rotation and pressed against a work surface of the mold and caused to run along the work surface, which is thereby polished.

In order to polish the work surface, a plurality of polishing tools of different grits (roughnesses) ranging from coarse to fine are prepared in advance. After a polishing tool of a certain grit has been used, another polishing tool of a finer grit is mounted on the spindle at the leading end of the arm of the robot. By thus exchanging polishing tools, the polishing operation is performed.

However, according to the aforementioned conventional polishing process, the polishing tool must be manually mounted on and removed from the spindle at the leading end of the arm of the polishing robot. That is, the operation of exchanging polishing tools is performed manually. Therefore, every time polishing tools are exchanged, the polishing process is interrupted. Consequently, it takes a long time to finish the polishing process.

Furthermore, the polishing tool is coupled to the spindle at the leading end portion of the arm of the polishing robot by means of a fastener, specifically, a collet chuck mechanism. In order to exchange polishing tools, the following operations must be performed. First, a wrench is used to loosen the chuck mechanism, and the previously used polishing tool is removed from the leading end portion of the spindle. A new polishing tool is mounted on the spindle, and the chuck mechanism is tightened.

The fact that it takes such a long time to exchange polishing tools also contributes to prolongation of the polishing process. Further, in order to exchange polishing tools, the operator has to stop other ongoing operations temporarily. Another problem is that unless an operator is present at the site where polishing tools are exchanged, the polishing process cannot be carried out. The fact that polishing tools are exchanged manually results in a decrease in the productivity in manufacturing molds.

SUMMARY OF THE INVENTION

The present invention has been made in the light of the aforementioned problems of the prior art. It is thus an object of the present invention to provide a mechanism and method for automatically exchanging polishing tools in a mold polishing device that can automatically exchange polishing tools.

In order to achieve the above-described and other objects, a mechanism for automatically exchanging polishing tools in a mold polishing device according to the present invention is constructed as follows. A polishing tool, which is mounted on a spindle provided on an arm of a multi-axis mold polishing robot and which rotates together with the spindle, is pressed against and moved along the work surface. A T-shaped tool holder, which has a pair of left and right horizontal latch pins protruding from a vertical rod that is coaxially integrated with the spindle, is provided at a leading end portion of the spindle. The polishing tool is provided with a pair of notches allowing the horizontal latch pins to be engaged therewith in a press-fitted manner and to be forcibly withdrawn upward therefrom. A tool stand and a tool removal stand are provided in proximity to a mold setting area to which a mold to be polished is fixed. A plurality of polishing tools are arranged at predetermined intervals on the tool stand, with the notches of the polishing tools facing upward. A horizontal slot, whose width is larger than the outer diameter of the vertical rod of the tool holder but smaller than the outer diameter of the polishing tool, is formed in the tool removal stand. The horizontal latch pins are press-fitted from above into the notches of a predetermined one of the polishing tools in the tool stand so as to mount the polishing tool to the tool holder. The horizontal latch pins are passed upward from a lower portion of the horizontal slot of the tool removal stand so as to remove the polishing tool from the tool holder.

The arm of the multi-axis robot is lowered from above towards a predetermined one of the polishing tools in the tool stand, whereby the horizontal latch pins of the tool holder are press-fitted into the notches of the polishing tool, which is then mounted on the tool holder. The arm of the multi-axis robot is raised such that the horizontal latch pins are passed upward from a lower portion of the horizontal slot of the tool removal stand. Thereby, the horizontal latch pins are forcibly withdrawn from the notches, and the polishing tool is removed from the tool holder. Thus, with a simple structure, the polishing tool can be mounted on and removed from the tool holder automatically.

Further according to the present invention, there may be provided a T-shaped cross bar portion including the horizontal latch pins of the T-shaped tool holder tiltably pin-jointed with the vertical rod. While the horizontal latch pins are in engagement with the notches of the polishing tool, the tool holder cooperates with the notches to constitute a universal joint.

The polishing tool, which is coupled to the spindle through the universal joint that is composed of the tool holder and the notches, can always move along the work surface stably.

Still further according to the present invention, the polishing tool may be composed of a polishing member holding ring that is cylindrically shaped and made of synthetic resin. A polishing member is held by a lower end portion of the polishing member holding ring. The notches, which are opposed to each other, are formed in a side wall of the polishing member holding ring. A necking portion, whose width is smaller than an outer diameter of the latch pins, is formed in each of the notches on a side where the latch pins are press-fitted. A latch pin guide portion of the necking portion has a V shape.

In the polishing member holding ring made of synthetic resin, as the horizontal latch pins are press-fitted into or forcibly withdrawn from the notches, the necking portion is elastically deformed and widened. Thus, the horizontal latch pins can be press-fitted into and withdrawn from the notches smoothly.

Furthermore, the V-shaped latch pin guide portion causes the horizontal latch pins to slide towards the notches so that the horizontal latch pins can be press-fitted into the notches easily, and also causes the horizontal latch pins to slide away from the notches so that the horizontal latch pins can be withdrawn from the notches easily.

The tool holder is solidly coupled to the spindle by means of a fastener. A pair of chamfers, which correspond to the horizontal latch pins and are designed to detect and determine a circumferential position of the tool holder, are provided in an outer peripheral surface of an outer cylinder portion of the fastener.

The chamfers provided in the outer peripheral surface of the outer cylinder portion of the fastener correspond to the horizontal latch pins. The tool is positioned such that the chamfers correspond to the horizontal slot of the tool removal stand and the notches of the polishing tool in the tool stand. Thus, the horizontal latch pins are located at positions corresponding to the horizontal slot of the tool removal stand and the notches of the polishing tool in the tool stand.

The horizontal slot of the tool removal stand is tilted in a longitudinal direction of the slot such that when passing upward from a lower portion of the horizontal slot, a pair of horizontal latch pins pass through the horizontal slot at different times.

When the horizontal latch pins corresponding to the notches of the polishing tool pass upward through the horizontal slot, the polishing tool, whose width is larger than that of the horizontal slot, hits the side edge portion thereof and cannot move upward. Hence, the horizontal latch pins are forcibly withdrawn from the notches, whereby the polishing tool is removed from the tool stand. Especially because the horizontal slot extends slantingly in the longitudinal direction, a pair of horizontal latch pins pass through the horizontal slot one after another. In other words, the horizontal latch pins are forcibly withdrawn from the notches one after another. Thus, the force applied to each of the horizontal latch pins is larger in forcibly drawing them out one after another than in forcibly drawing them out simultaneously when the horizontal slot extends horizontally. Accordingly, the operation of forcibly drawing out the horizontal latch pins can be performed smoothly.

The invention also encompasses a method for automatically exchanging polishing tools in a mold polishing device wherein a polishing tool, which is mounted on a spindle provided at an arm of a multi-axis mold polishing robot and rotates together with the spindle, is pressed against and moved along the work surface. In accordance with the inventive method, a T-shaped tool holder, which has a pair of left and right horizontal latch pins protruding from a vertical rod that is coaxially integrated with the spindle, is provided at a leading end portion of the spindle. The polishing tool is provided with a pair of notches allowing the horizontal latch pins to be engaged therewith in a press-fitted manner and to be forcibly withdrawn upward therefrom. A tool stand and a tool removal stand are provided in proximity to a mold setting area to which a mold to be polished is fixed. A plurality of polishing tools are arranged at predetermined intervals in the tool stand, with the notches of the polishing tools facing upward. A horizontal slot, whose width is larger than the outer diameter of the vertical rod of the tool holder but smaller than an outer diameter of the polishing tools, is formed in the tool removal stand. The horizontal latch pins are passed upward from a lower portion of the horizontal slot of the tool removal stand so as to remove a previously used polishing tool from the tool holder. The horizontal latch pins are then press-fitted from above into the notches of a predetermined one of the polishing tools in the tool stand so as to mount a new polishing tool to the tool holder.

The arm is raised from the tool removal stand, and the used polishing tool is removed from the tool holder. Thereafter, the arm is lowered towards the tool stand so as to mount a new polishing tool to the tool holder. In this manner, polishing tools are exchanged automatically.

The tool holder is solidly coupled to the spindle by means of a fastener. A pair of chamfers, which correspond to the horizontal latch pins and are designed to detect and determine a circumferential position of the tool holder, are provided in an outer peripheral surface of an outer cylinder portion of the fastener. Prior to a polishing tool removing process, the spindle is turned in steps in a predetermined manner in which the outer cylinder portion of the fastener blocks the light path of light sensors for detecting and determining the position of the tool holder. The tool holder is circumferentially positioned such that the chamfers assume a predetermined position that does not block the light path, namely, a position where the horizontal latch pins correspond to the horizontal slot of the tool removal stand and the notches of the polishing tool in the tool stand.

When the spindle (the fastener) is turned in steps, the chambers of the fastener change their circumferential positions every time the spindle stops. Therefore, starting from a state where the outer peripheral surface of the fastening nut blocks the light path of light beams of the light sensors, i.e., the state where the outer peripheral surface of the fastening nut blocks the light beams of the light sensors, the spindle is turned in steps as follows. The tool holder, including the horizontal latch pins, is positioned in the circumferential direction such that the fastening nut assumes a position where the chamfers do not block the light path, i.e., the position where the outer peripheral surface of the fastening nut does not block the light beams of the light sensors. Thus, the horizontal latch pins can be positioned at positions corresponding to the horizontal slot of the tool removal stand and the notches of the polishing tool in the tool stand.

BRIEF DESCRIPTION OF THE DRAWINGS

FIG. 4 is an explanatory view of movements of a polishing tool in a mold polishing process.

FIG. 5 is a perspective view of instruction points on a work surface (curved surface), which instruction points are to be given to the multi-axis mold polishing robot.

FIGS. 6(a) and 6(b) are perspective views of movements of the polishing tool on the work surface (curved surface).

FIG. 7 is a perspective view of instruction points on a work surface (flat surface), which instruction points are to be given to the multi-axis mold polishing robot.

FIGS. 8(a) and 8(b) are perspective views of movements of the polishing tool on the work surface (flat surface).

DESCRIPTION OF THE PREFERRED EMBODIMENTS

Preferred embodiments of the present invention now will be described with reference to the appended drawings.

Figure 1:
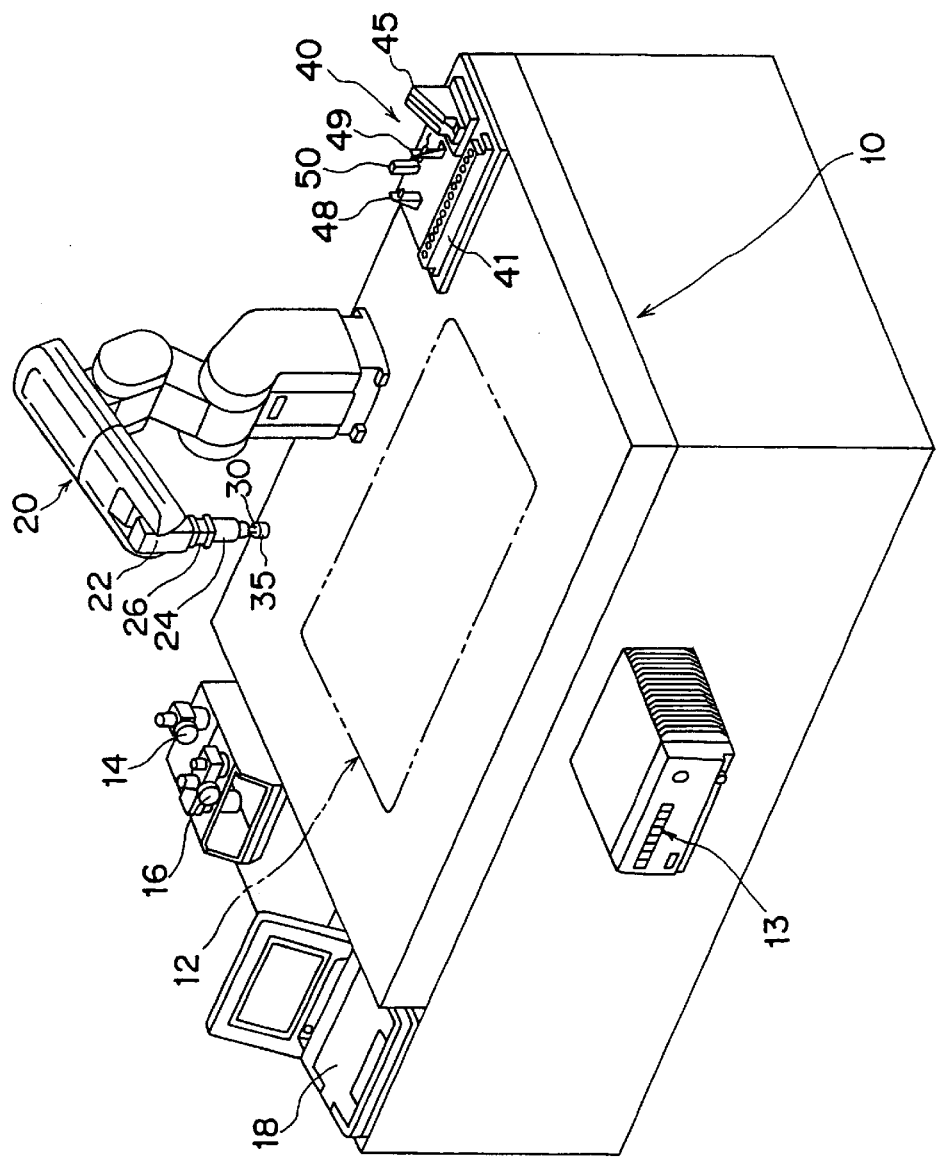
FIG. 1 is a perspective view of the overall structure of a mold polishing device according to a preferred embodiment of the present invention.

FIGS. 1 through 15 illustrate a preferred embodiment of the present invention in which:

FIG. 1 is a perspective view showing the overall structure of a mold polishing device constructed according to a preferred embodiment of the present invention.

Figure 2:
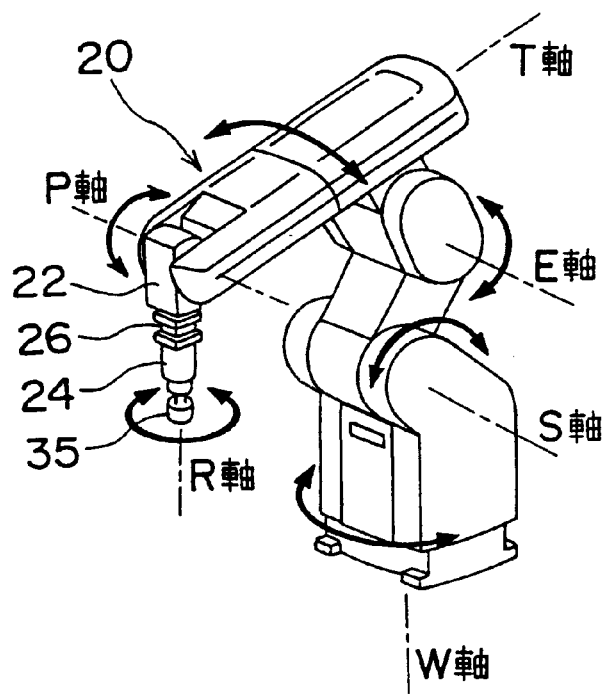
FIG. 2 is a perspective view of a multi-axis mold polishing robot used in the mold polishing device.

FIG. 2 is a perspective view of a multi-axis mold polishing robot used in the mold polishing device.

Figure 3:
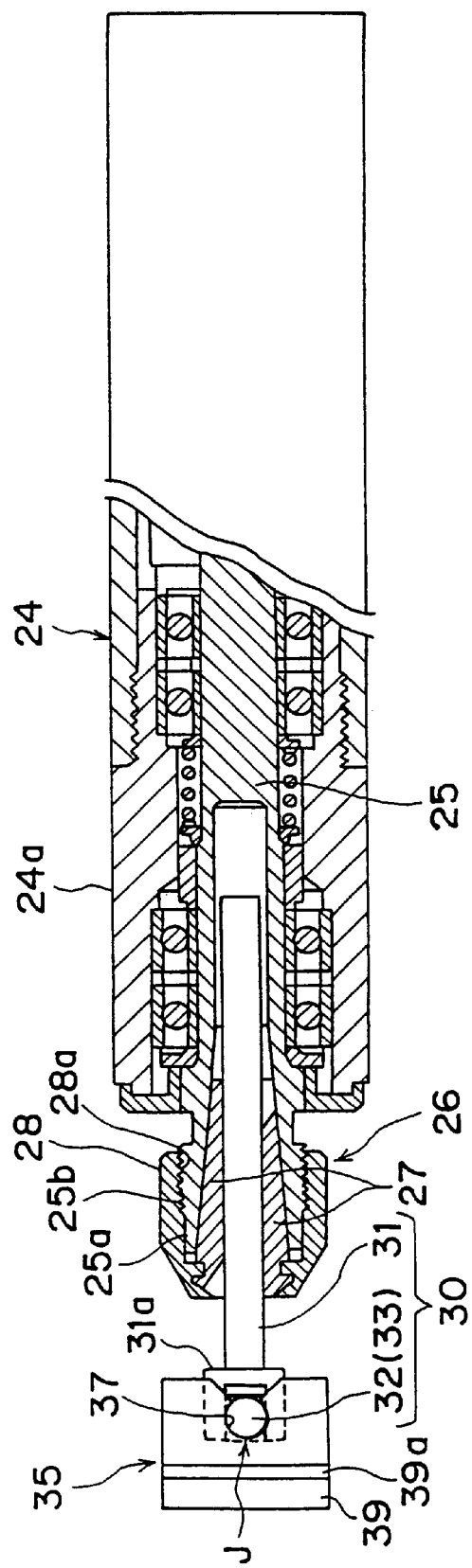
FIG. 3 is a cross-sectional view mainly showing a spindle mounted on an arm of the robot.

FIG. 3 is a cross-sectional view mainly showing a spindle mounted on an arm of the robot.

FIG. 4 is an explanatory view of movements of a polishing tool in a mold polishing process.

FIG. 5 is a perspective view of instruction points on a work surface (curved surface), which instruction points are to be given to the multi-axis mold polishing robot.

FIGS. 6(a) and 6(b) are perspective views of movements of the polishing tool on the work surface (curved surface).

FIG. 7 is a perspective view of instruction points on a work surface (flat surface), which instruction points are to be given to the multi-axis mold polishing robot.

FIGS. 8(a) and 8(b) are perspective views of movements of the polishing tool on the work surface (flat surface).

Figure 9:
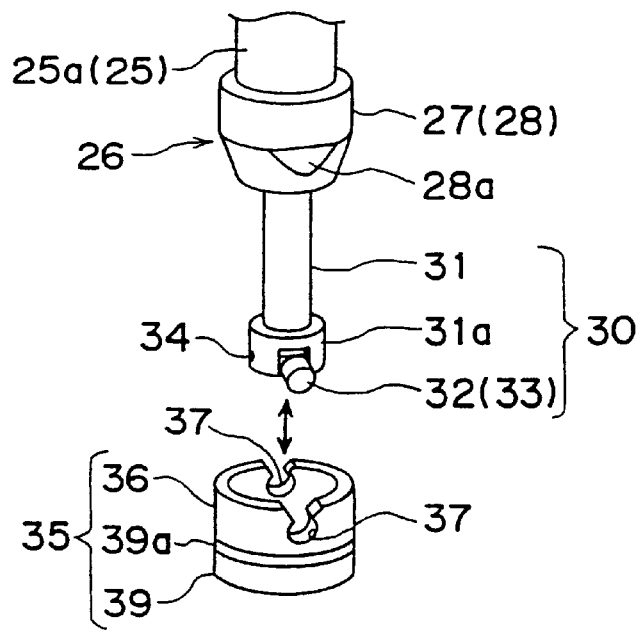
FIG. 9 is a perspective view of a tool holder and the polishing tool.

FIG. 9 is a perspective view of a tool holder and the polishing tool.

Figure 10:
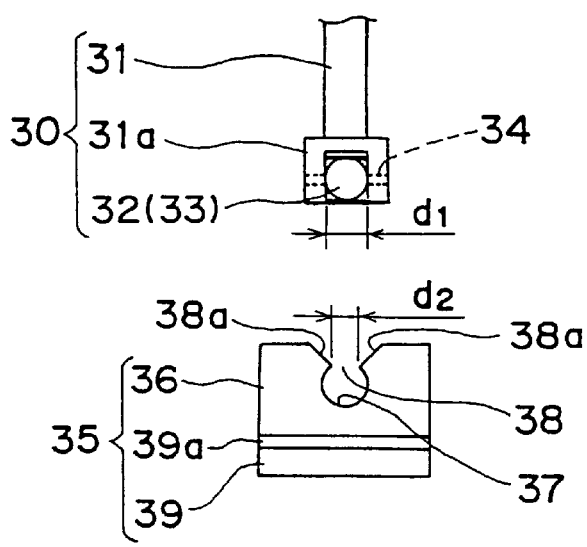
FIG. 10 shows a notch formed in the polishing tool.

FIG. 10 shows a notch formed in the polishing tool.

Figure 11:
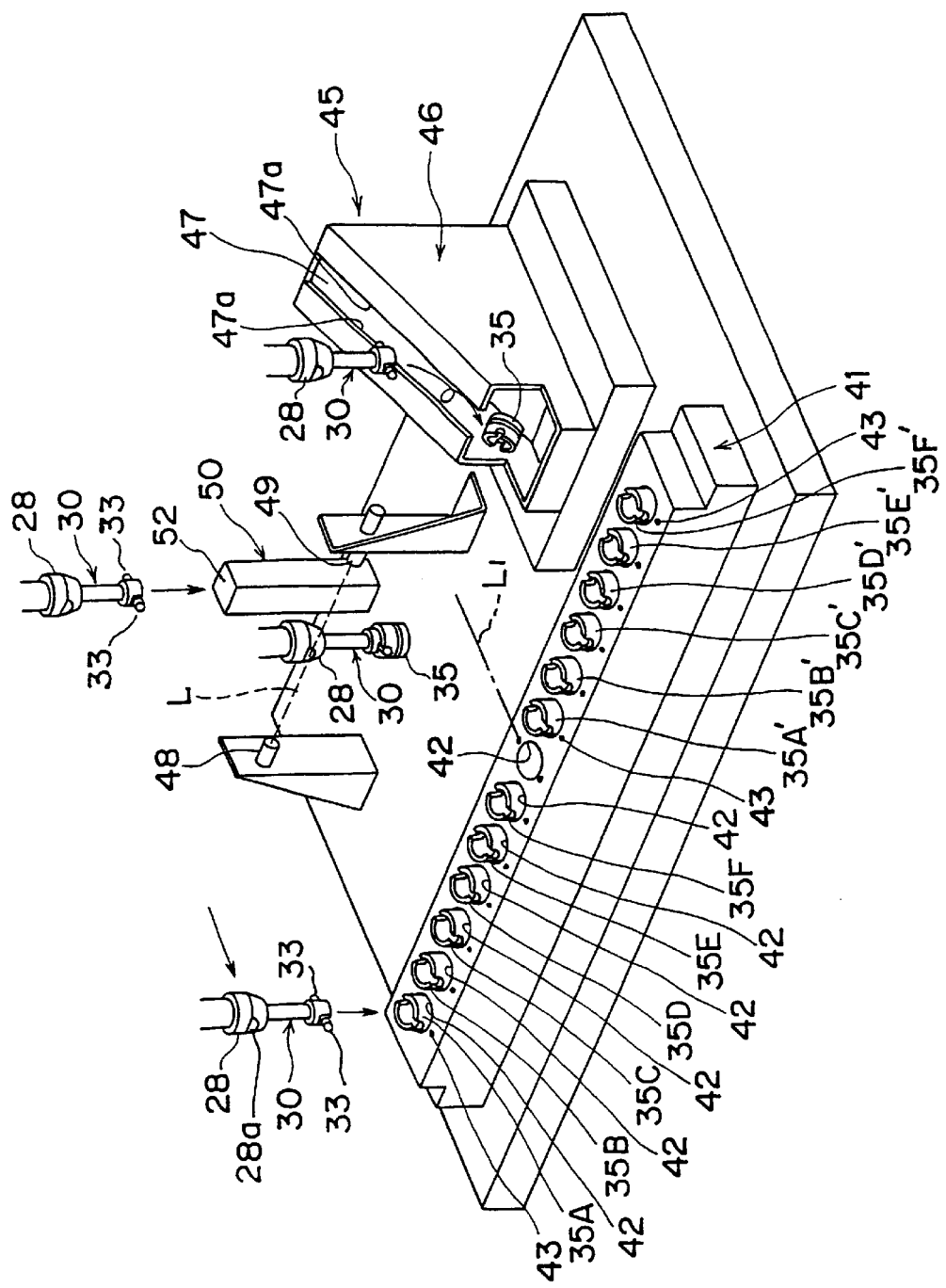
FIG. 11 is a perspective view of the overall structure of a mechanism for automatically exchanging polishing tools.

FIG. 11 is a perspective view of the overall structure of a mechanism for automatically exchanging polishing tools.

Figure 12A:
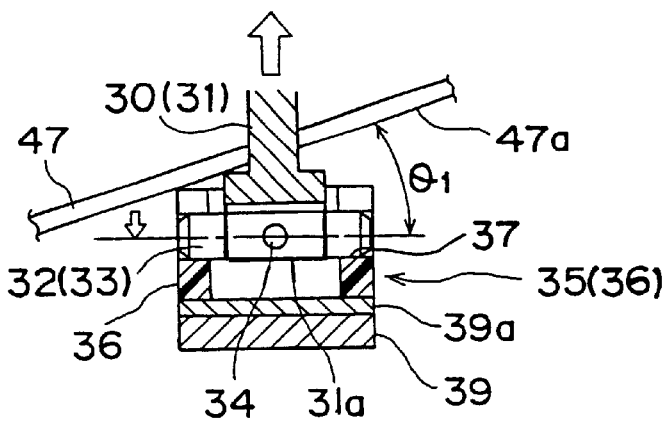
FIG. 12(a) is an explanatory view of a process of removing a polishing tool, specifically a cross-sectional view showing a state where one side of the polishing tool is about to contact a side edge portion of a horizontal slot.
Figure 12B:
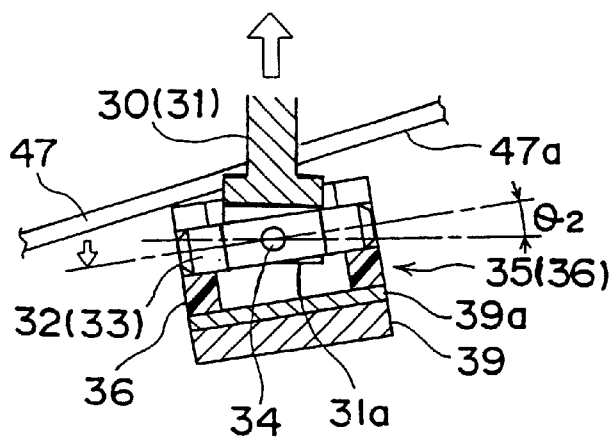
FIG. 12(b) is an explanatory view of the process of removing the polishing tool, namely a cross-sectional view showing a state where the polishing tool has tilted to a maximum tilt position of a horizontal rod after one side of the polishing tool has contacted the side edge portion of the horizontal slot.
Figure 12C:
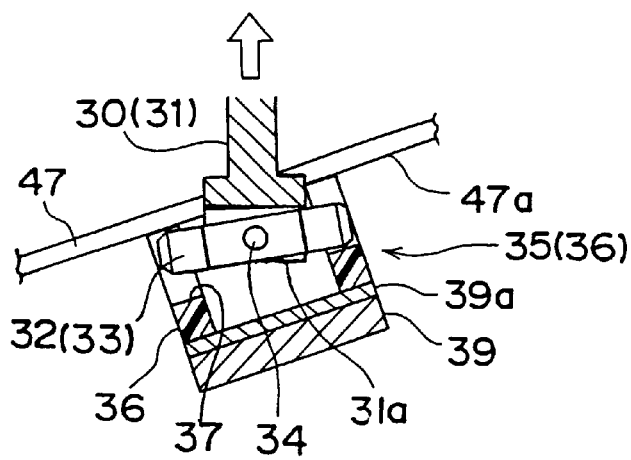
FIG. 12(c) is an explanatory view of the process of removing the polishing tool, specifically a cross-sectional view showing a state where one of a pair of horizontal latch pins has dropped out of the notch and the other horizontal latch pin is about to drop out of the notch.

FIGS. 12(a)–12(c) are explanatory views of a process of removing a polishing tool, of which FIG. 12(a) is a cross-sectional view depicting a state where one side of the polishing tool is about to contact a side edge portion of a horizontal slot, FIG. 12(b) is a cross-sectional view showing a state where the polishing tool has tilted to a maximum tilt position of a horizontal rod after one side of the polishing tool has contacted the side edge portion of the horizontal slot, and FIG. 12(c) is a cross-sectional view showing a state where one of a pair of horizontal latch pins has dropped out of the notch and the other horizontal latch pin is about to drop out of the notch.

Figure 13:
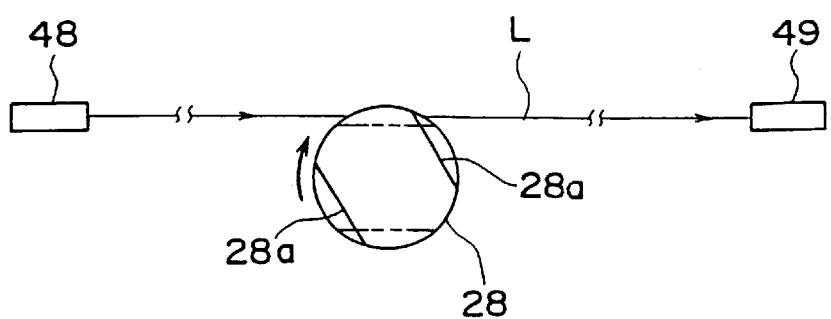
FIG. 13 is an explanatory view of the operation of a detection mechanism for determining a circumferential position of a horizontal latch pin.

FIG. 13 is an explanatory view of the operation of a detection mechanism for determining a circumferential position of a horizontal latch pin.

Figure 14:
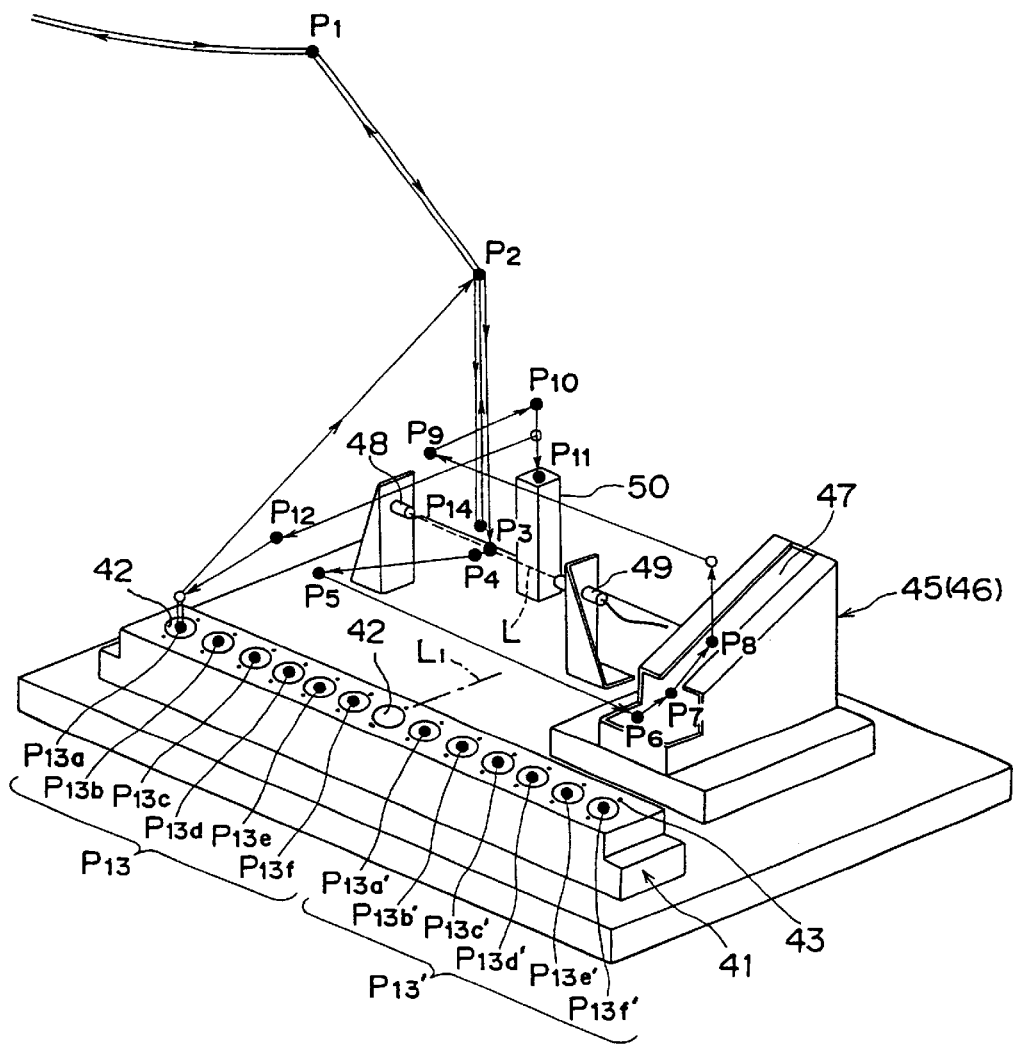
FIG. 14 is a perspective view showing movements of the tool holder at the end of an arm of the robot.

FIG. 14 is a perspective view indicating movements of the tool holder at the end of an arm of the robot.

Figure 15:
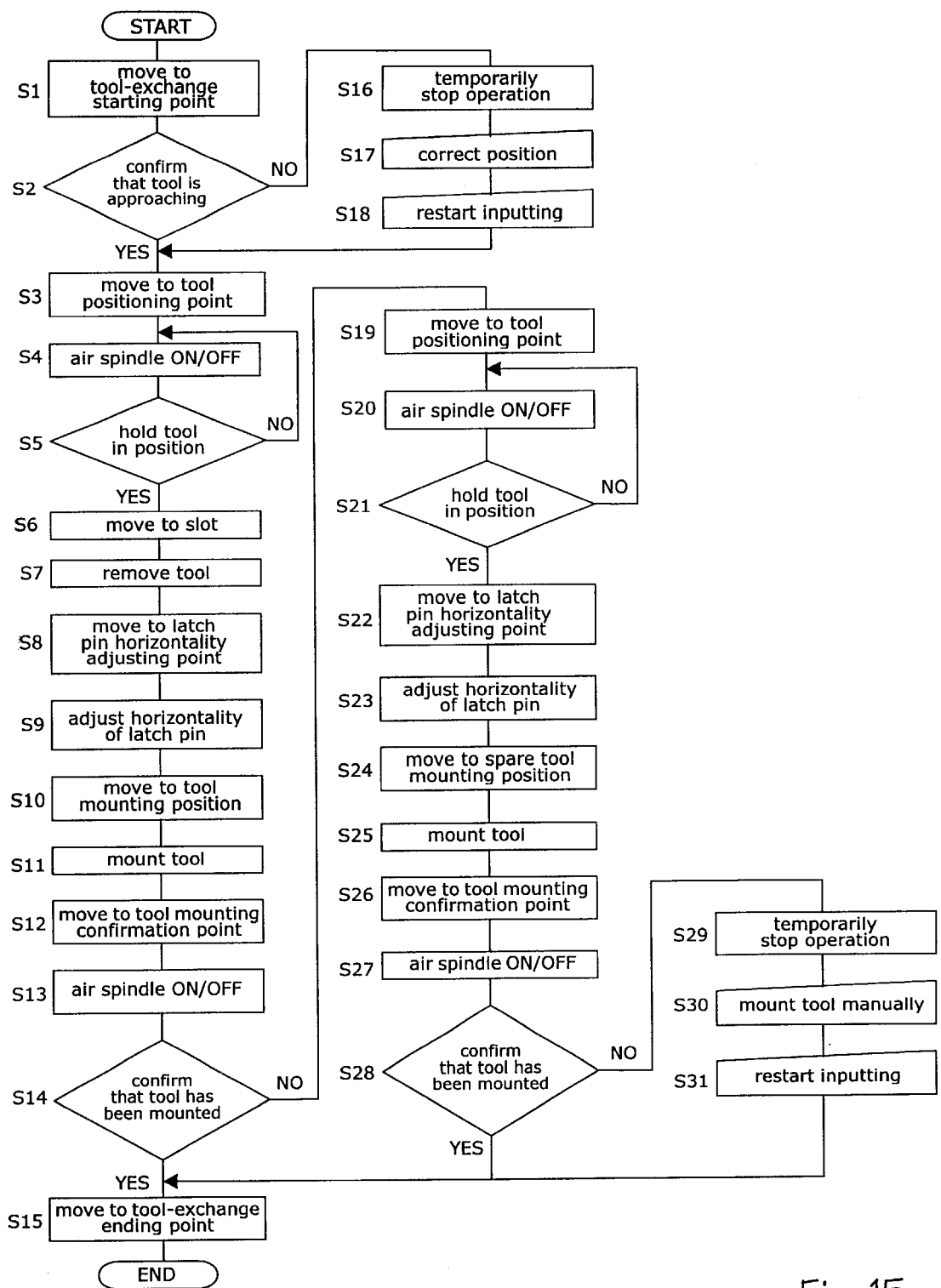
FIG. 15 is a flowchart of a series of processes from a polishing tool removing process to a polishing tool mounting process performed by the mechanism for automatically exchanging polishing tools.

FIG. 15 is a flowchart of a series of processes from a polishing tool removing process to a polishing tool mounting process performed by the mechanism for automatically exchanging polishing tools.

DESCRIPTION OF THE PREFERRED EMBODIMENTS

As can be seen from the overall structure thereof shown in FIG. 1, the mold polishing device is constructed as follows. The mold polishing device is mainly composed of a base 10, a multi-axis mold polishing robot 20, a controller 13 for controlling the robot, and a mechanism 40 for automatically exchanging polishing tools. A mold setting area 12 is provided on a top face of the base 10. The robot 20 is fixed at its base end portion to the base 10. The controller 13 is fixed to a front side of the base 10 and provided with an electric power switch, a starter switch, a stop switch, a reset switch and the like. The mechanism 40 is provided in the vicinity of the mold setting area 12 of the base 10.

As shown in FIG. 2, the robot 20 is constructed as a six-axis control robot that has a rated output, for example, of 80 watts or less. A front arm 22 of the robot 20 can turn on a first wrist pitch axis (P-axis), a second wrist pitch axis (T-axis), an elbow axis (E-axis), a shoulder axis (S-axis), and a waist axis (W-axis). A rotary spindle member 25 of an pneumatic spindle 24 of the robot 20 is integrated with the front arm 22 and can turn on a wrist roll axis (R-axis).

The rotary spindle member 25 of the pneumatic spindle 24 is drivingly rotated by a built-in air motor and urged axially forward by an air cylinder 26. Thus, a polishing tool 35 mounted on the rotary spindle member 25 is pressed against the work surface of the mold under a predetermined pressure, whereby the surface is polished. The rotational speed and axial urging force of the rotary spindle member 25 can be adjusted by an air motor regulator 14 and an air cylinder regulator 16, respectively. The air motor regulator 14 and the air cylinder regulator 16 are provided in the vicinity of the robot 20.

That is, as indicated by reference characters A through F in FIGS. 5, 6(a) and 6(b) and reference characters A through D in FIGS. 7 and 8, instruction points are inputted to the controller 13 by a personal computer 18. These instruction points are reference points according to which the front arm 22 of the robot 20 runs on the work surface 62 (see FIG. 4) of the mold 60. The polishing tool 35, which is supported by the front arm 22, is pressed against the work surface 62 of the mold 60 and controlled so as to sequentially pass the instruction points.

While FIGS. 4 through 6(b) show a case where the work surface of the mold is curved, FIGS. 7, 8(a) and 8(b) show a case where the work surface of the mold is flat. While FIGS. 6(a) and 8(a) show a state where the polishing tool runs lengthwise, FIGS. 6(b) and 8(b) show a state where the polishing tool runs crosswise. As shown in FIG. 4, the polishing tool 35, which is mounted on the rotary spindle member 25 of a spindle motor 24, moves linearly from a point A to a point B on the curved work surface 62. During such a movement of the polishing tool 35, the rotary spindle member 25 is kept perpendicular to the work surface 62. When running, the polishing tool 35, which is urged axially forward by the air cylinder 26, is always pressed against the work surface 62.

As shown in FIG. 3 on an enlarged scale, the front end portion of the rotary spindle member 25 of the pneumatic spindle 24 protrudes forward, in the form of a hollow cylinder, from a spindle case 24a supported by the front arm 22. Thus, the rotary spindle member 25 has a forward-protruding cylinder portion 25a, whose outer peripheral surface has male threads 25b. The forward-protruding cylinder portion 25a accommodates a wedge-shaped collet chuck 27. The forward-protruding portion 25a, which is screwed into a cylindrical fastening nut 28, and holds a vertical rod 31 of a ring holder 30 integrally. The inner peripheral surface of the fastening nut 28 has female threads 28a, and the ring holder 30 is designed as a polishing tool holder. In other words, the forward-protruding cylinder portion 25a of the rotary spindle member 25, the wedge-shaped collet chuck 27, and the fastening nut 28 constitute a collet chuck mechanism 26, which serves as a fastener for solid-coupling the vertical rod 31 of the ring holder 30 to the rotary spindle member 25.

As shown in FIGS. 3, 9, 10 and 12(a)–12(c), the thin vertical rod 31 of the ring holder 30 has a circular cross-section and is bifurcated at a leading end portion thereof. A horizontal rod 32, which is short and of a rectangular cross-section, is pin-jointed with the vertical rod 31 such that the horizontal rod 32 can be tilted with respect to the vertical rod 31. Thus, the vertical rod 31 and the horizontal rod 32 are arranged in the shape of T (see FIGS. 12(a)–12(c)). Horizontal latch pins 33 of a circular cross-section are provided at respective ends of the horizontal rod 32. Reference numeral 34 in FIGS. 12(a)–12(c) denotes a coupling pin for coupling the horizontal rod 32 to a leading end portion 31a of the vertical rod. The horizontal rod 32 with the horizontal latch pins 33 can be tilted with respect to the vertical rod 31 through an angle of $\pm\theta_2$.

As shown in FIGS. 9 and 13, a pair of chamfers 28a and 28a, which are opposed to each other and designed to detect and determine the circumferential position of the ring holder, are formed in the outer peripheral surface of the fastening nut 28, which serves as a fastener. The ring holder 30 is solidly coupled to the rotary spindle member 25 by the collet chuck mechanism 26 such that the horizontal rod 32 and the horizontal latch pins 33 can be correctly located at positions corresponding to the respective chamfers 28a in the circumferential direction.

The polishing tool 35 is constructed as shown in FIGS. 9, 10 and 12(a)–12(c). That is, a disc-shaped polishing member 39 is integrally fixed to the lower end portion of a polishing member holding ring 36, which is made of synthetic resin and has the shape of a cylinder. The horizontal latch pins 33 of the ring holder 30 can be press-fitted from above into and engaged with a side wall of the holding ring 36. A pair of notches 37 are formed in the holding ring 36 so as to allow the horizontal latch pins 33 to be forcibly withdrawn upward.

More specifically, on the side where the latch pins are press-fitted, each of the notches 37 is provided with a necking portion 38, whose width $d_2$ is smaller than the outer diameter $d_1$ of the latch pin 33 ($d_2<d_1$). The latch pin 33, which is in engagement with the notch 37, is prevented by the necking portion 38 from being withdrawn, whereby the polishing tool 35 is securely mounted on the ring holder 30. However, as the horizontal latch pin 33 is press-fitted into or forcibly withdrawn from the notch 37, the necking portion 38 is elastically deformed and widened. Thus, the ring holder 30 and the polishing tool 35 are designed such that the horizontal latch pins 33 can be press-fitted into and withdrawn from the notches 37 smoothly.

A latch pin guide portion 38a of the necking portion 38 has the shape of V. The V-shaped latch pin guide portion 38a causes the horizontal latch pins 33 to slide towards the notches 37 so that the horizontal latch pins 33 can be press-fitted into the notches 37 easily, and causes the horizontal latch pins 33 to slide away from the notches 37 so that the horizontal latch pins 33 can be withdrawn from the notches 37 easily.

When the horizontal latch pins 33 are in engagement with the notches 37 of the polishing tool 35, the horizontal rod 32 can be tilted upward and downward with respect to the vertical rod 31 and rotate relative to the notches 37. Thus, the ring holder 30 and the notches 37 cooperate with each other so as to constitute a universal joint J (see FIG. 3).

The mechanism 40 for automatically exchanging polishing tools is placed at the right corner of the base 10 of the mold polishing device 10. As shown in FIG. 11, the mechanism 40 is mainly composed of a tool stand 41, a tool removal stand 45 and a pair of light-emitting and light-receiving sensors 48 and 49. Disposed in the tool stand 41 are a plurality of polishing tools 35, which are arranged at equal intervals in left-to-right directions, with the notches 37 facing upward (i.e., in left-to-right direction as viewed from a location in front of the base 10). Formed in the tool removal stand 45 is a horizontal slot 47, whose width is larger than the outer diameter of the bifurcated leading end portion 31a of the vertical rod 31 of the ring holder 30 but smaller than the outer diameter of the polishing tool 35 (the holding ring 36). The light-emitting and light-receiving sensors 48 and 49 form means for detecting and determining the circumferential position of the ring holder 30.

The tool stand 41 is provided with thirteen tool accommodation holes 42, which are arranged at equal intervals in the left-to-right direction. Except for the central hole 42 (the seventh hole from the left side), the six left-and-right holes 42 accommodate polishing tools 35 (35A through 35F and 35A' through 35F'). The right-side polishing tools 35 (35A' through 35F') are spare tools reserved for the case where the left-side polishing tools 35 (35A through 35F) cannot be mounted on the ring holder 30.

A peripheral portion of each of the tool accommodation holes 42 has a pair of marks 43 which indicate the positions of the notches 37 of the polishing tool 35 accommodated in that hole 42. Each of the polishing tools 35 is accommodated such that the notches 37 are aligned with respective ones of the marks 43.

The light-emitting and light-receiving sensors 48 and 49 position the horizontal latch pin 33 of the ring holder 30 in accordance with the marks 43 (the notch 37). The ring holder 30 is then lowered towards a predetermined one of the polishing tools 35 so that the horizontal latch pins 33 are press-fitted into and engaged with the notches 37. In this manner, the polishing tool 35 can be mounted on the ring holder 30.

The polishing tools 35 are of the same size but have different polishing effects. As regards a set of polishing tools 35A through 35F and a set of polishing tools 35A' through 35F', the grit of the polishing member 39 of the polishing tool 35 becomes coarser towards the left side and finer towards the right side. In other words, the polishing tools 35 are arranged such that the polishing effect decreases from the left to the right. The polishing tools 35A and 35A', 35B and 35B', 35C and 35C' . . . each have the same polishing effect. Namely, the set of the polishing tools 35A through 35F corresponds to the set of the spare polishing tools 35A' through 35F'. The polishing tools 35A through 35F accommodated in the tool stand 41 are mounted on the ring holder 30, sequentially starting from the left side. Thus, the work surface of the mold can be polished and mirror-finished.

The tool removal stand 45 is composed of a trapezoidal box-shaped base 46 in which the horizontal slot 47 is formed. The horizontal slot 47 extends perpendicular to the longitudinal direction of the tool stand 41 (i.e., parallel to a direction $L_1$ determined by a pair of marks 43 and 43). When the ring holder 30 passes upward through the horizontal slot 47 after the polishing tool 35 has been mounted on the ring holder 30, the polishing tool 35 is raked downward by a slot side edge portion 47a. In other words, when the ring holder 30 passes upward through the horizontal slot 47 after the polishing tool 35 has been mounted on the ring holder 30 and the horizontal latch pin 33 has been positioned parallel to the horizontal slot 47, the polishing tool 35 hits the slot side edge portion 47a. Because the size of the polishing tool 35 is larger than the width of the horizontal slot 47, the polishing tool 35 cannot move upward. Hence, the horizontal latch pins 33 are forcibly withdrawn from the notches 37, whereby the polishing tool 35 can be removed from the ring holder 30.

The horizontal slot 47 is tilted such that the front portion thereof becomes lower than the rear portion thereof. As shown in FIG. 12, the tilt angle $\theta_1$ of the horizontal slot 47 is larger than the maximum tilt angle $\theta_2$ of the horizontal rod 32 with respect to the vertical rod 31. Therefore, when the ring holder 30 passes upward through the horizontal slot 47, a pair of horizontal latch pins 33 pass through the horizontal slot 47 one after another. As a result, the horizontal latch pins 33 are forcibly withdrawn from the notches 37 in sequence. Thus, the force applied to each of the horizontal latch pins 33 is larger in forcibly drawing them out one after another than in forcibly drawing them out simultaneously when the horizontal slot 47 extends horizontally. Thus, the polishing tool 35 can be removed from the ring holder 30 with a small force. Consequently, the reaction force applied to the robot in removing the polishing tool is small.

It will be explained hereinafter, based on FIGS. 12(a), 12(b) and 12(c), how the polishing tool 35 mounted on the ring holder 30 is removed from the ring holder 30 in passing through the horizontal slot 47.

As shown in FIG. 12(a), when the ring holder 30 moves upward from a lower position of the horizontal slot 47, one side of the polishing tool 35 (the holding ring 36) hits the horizontal slot side edge portion 47a. As indicated by a blank arrow in FIG. 12(a), as the ring holder 30 is raised, the aforementioned one side of the polishing tool 35 is pressed downward by the horizontal slot side edge portion 47a. As shown in FIG. 12(b), the polishing tool 35 is tilted to the maximum tilt position of the universal joint J, whereby the horizontal rod 32 cannot be tilted with respect to the vertical rod 31 easily. As shown in FIG. 12(c), as the ring holder 30 moves further upward, one of the horizontal latch pins 33 is forcibly withdrawn from the notch 37, and the other horizontal latch pin 33 is then forcibly withdrawn from the notch 37. In this manner, the polishing tool 35 is removed from the ring holder 30.

A pair of light-emitting and light-receiving sensors 48 and 49, which serve as means for detecting and determining the position of the ring holder, are provided in the vicinity of the tool removal stand 45 and the tool stand 41. These sensors 48 and 49 are arranged opposite to each other in left-to-right directions. The light path L of light beams transmitted between the light-emitting and light-receiving sensors 48 and 49 is designed to be perpendicular to the direction in which the horizontal slot 47 of the tool removal stand 45 extends and to the direction $L_1$ in which a pair of marks 43 of the tool stand 41 are formed, i.e., the direction corresponding to a pair of notches 37 of the polishing tool 35 accommodated in the tool stand 41.

As shown in FIG. 13, the ring holder 30 is vertically arranged so that the outer peripheral surface of the fastening nut 28 blocks the light path L of light beams transmitted between the light-emitting and light-receiving sensors 48 and 49. The pneumatic spindle 24 then turns the rotary spindle member 25 in steps, whereby the ring holder 30 and the horizontal latch pins 33 can be positioned in the circumferential direction. That is, as indicated by a dotted line in FIG. 13, the ring holder 13 is held at a predetermined circumferential position where the chamfer 28a extends parallel to the light path L and thus does not block the light beams in the position where the horizontal latch pins 33 extend parallel to the direction in which the horizontal slot 47 of the tool removal stand 45 extends and to the direction $L_1$ corresponding to the marks 43 at the periphery of the tool accommodation hole 42 of the tool stand 41.

Namely, as indicated by a solid line in FIG. 13, starting from a state where the outer peripheral surface of the fastening nut 28 blocks the light path L of light beams emitted from the light-emitting sensor 48, if the rotary spindle member 25 and fastening nut 28 held thereby is turned in steps, the chamfer 28a of the fastening nut 28 changes its circumferential position every time the rotary spindle member 25 stops. As indicated by a line in FIG. 13, when the fastening nut 28 assumes a position where the chamfer 28a does not block the light path L (the position where the outer peripheral surface of the fastening nut 28 does not block the light beams emitted from the light-emitting sensor 48), the horizontal latch pins 33 assume a position corresponding to the horizontal slot 47 of the tool removal stand 45 and the marks 43 at the periphery of the tool accommodation hole 42 of the tool stand 41.

Accordingly, the rotary spindle member 25, and hence the fastening nut 28, is turned in steps until the light-receiving sensor 49 receives the light beams emitted from the light-emitting sensor 48, so that the ring holder 30 and the horizontal latch pin 33 can be positioned in the circumferential direction. Hence, the horizontal latch pins 33 can be held at positions corresponding to the horizontal slot 47 of the tool removal stand 45 and the notches 37 of the polishing tool of the tool stand 41.

After the ring holder 30 has been positioned by the light-emitting and light-receiving sensors 48 and 49, a used polishing tool 35 is removed from the ring holder 30 at the tool removal stand 45. A new polishing tool 35 is then mounted on the ring holder 30 at the tool stand 41.

Reference numeral 50 denotes a horizontal rod adjusting stand that is provided in the vicinity of the tool removal stand 45. After a tool-removing process and prior to a tool-mounting process, the leading end portion of the ring holder 30 is pressed from above onto the upper end face 52 of the horizontal rod adjusting stand 50. Thus, the horizontal rod 32 and the horizontal latch pins 33 can be corrected for horizontality.

That is, during a tool-removing process, the horizontal rod 32 and the horizontal latch pins 33 may be placed in a tilted state with respect to a horizontal line owing to an impact caused when the horizontal latch pins 33 are forcibly withdrawn. If a tool-mounting process is then started, the horizontal latch pins 33 may not be well engaged with the notches 37 of the polishing tool. Therefore, the horizontal rod adjusting stand 50 is used to correct the horizontal rod 32 and the horizontal latch pins 33 for horizontally. As a result, during a tool-mounting process, the horizontal latch pins 33 can be press-fitted into the notches 37 of the polishing tool 35 smoothly.

FIG. 14 shows movements of the ring holder at the leading end of the arm of the robot, wherein reference characters $P_1$ through $P_{14}$ denote travelling points along which the arm of the robot moves. The respective travelling points $P_1$ through $P_{14}$ are inputted to the controller 13 by the personal computer 18 and stored therein.

Point $P_1$ represents a tool-exchange starting/ending point, which is a reference point where a process of exchanging polishing tools is started or ended. $P_2$ represents a light sensor detection approach point, which is located directly above the light path L of light beams of the sensors 48 and 49. $P_3$ represents a tool approach confirmation point, which is located directly below the light sensor detection approach point $P_2$. The tool approach confirmation point $P_3$ is provided to confirm whether or not the center of the fastening nut 28 has been located on the light path L of light beams of the light sensors 48 and 49 and the arm (the ring holder) of the robot has properly entered a predetermined position in the tool-exchange process.

Point $P_4$ represents a tool positioning point where the outer peripheral surface of the fastening nut 28 blocks the light path L of the light beams of the light sensors 48 and 49 (see FIG. 13) after having moved horizontally forward by a predetermined distance, corresponding to about a half the diameter of the fastening nut 28, from the tool approach confirmation point $P_3$. The pneumatic spindle 24 turns the rotary spindle member 25 in steps, whereby the ring holder 30 and the horizontal latch pins 33 can be positioned in the circumferential direction.

Point $P_5$ represents a first tool removing approach point, which is located further forward of the tool positioning point $P_4$. $P_6$ represents a second tool removing approach point that is located directly opposite the entrance of the horizontal slot 47 of the tool removal stand 45, with the vertical rod 31 of the ring holder 30 being positioned directly opposed to the horizontal slot 47. $P_7$ represents a point corresponding to the entrance of the horizontal slot 47 of the tool removal stand 45. The polishing tool 35, which is mounted on the ring holder 30, is located lower than the horizontal slot 47. $P_8$ represents a point corresponding to the exit of the horizontal slot 47. The ring holder 30 is raised vertically upward from the point $P_8$ so that, the polishing tool 35 is raked downward by the horizontal slot side edge portion 47a and removed from the ring holder 30.

Point $P_9$ represents a first horizontal rod correction approach point, and $P_{10}$ represents a second horizontal rod correction approach point located directly above the horizontal rod adjusting stand 50. The arm is lowered from the second approach point $P_{10}$ and then reaches a horizontal rod correction point $P_{11}$. The leading end portion of the ring holder 30 is then pressed toward to the horizontal rod adjusting stand 50, whereby the horizontal rod 32 and the horizontal latch pin 33 are corrected for horizontality.

$P_{12}$ represents a tool mounting approach point located in close proximity to the tool stand 41. Tool mounting points are represented by $P_{13}$ ($P_{13}a$, $P_{13}b$, $P_{13}c$, $P_{13}d$, $P_{13}e$ and $P_{13}f$), and spare tool mounting points are represented by $P_{13}$ ($P_{13}a'$, $P_{13}b'$, $P_{13}c'$, $P_{13}d'$, $P_{13}e'$ and $P_{13}f'$).

Point $P_{14}$ represents a tool mounting confirmation point that is located directly below the light sensor detection approach point $P_2$. The tool mounting confirmation point $P_{14}$ is provided to confirm whether or not the polishing tool 35 mounted on the ring holder 30 has been located on the light path L of light beams of the light sensors 48 and 49 and the polishing tool 35 has been mounted securely. The tool mounting confirmation point $P_{14}$ is located slightly above the tool approach confirmation point $P_3$.

Thus, (the ring holder 30 supported by) the arm of the robot moves in the sequence of:

$$P_1 \to P_2 \to P_3 \ldots P_{11} \to P_{12} \to P_{13} \to P_2 \to P_{14} \to P_2 \to P_1,$$

whereby a used tool, which is mounted on the ring holder 30, is removed therefrom and a new tool is mounted thereto.

A flowchart of a tool-exchange process in the mechanism 40 for automatically exchanging polishing tools will be described hereinafter with reference to FIG. 15.

First in step $S_1$, the arm which carries the ring holder 30 equipped with a used polishing tool moves to the tool-exchange starting/ending point $P_1$. It is then determined in step $S_2$ whether or not the arm has moved to the tool approach confirmation point $P_3$ through the light sensor detection approach point $P_2$ and the arm (the ring holder) has properly entered the predetermined position in the tool-exchange process. If the result is affirmative in step $S_2$, the operation proceeds to step $S_3$ where the arm moves to the tool positioning point $P_4$. The operation then proceeds to step $S_4$.

On the other hand, if the result is negative in step $S_2$, i.e., if the light sensors 48 and 49 cannot confirm the presence of the arm, the operation proceeds to step $S_{16}$ where the arm is temporarily stopped from being driven. Then in step $S_{17}$, the arm is moved by predetermined distances in forward-and-reverse, up-and-down and left-to-right directions so as to adjust the posture of the arm. In step $S_{18}$, the driving of the arm is started again. The operation then proceeds to step $S_4$ through step $S_3$.

In step $S_4$, the pneumatic spindle 24 turns the rotary spindle member 25 by a predetermined amount. It is then determined in step $S_5$, by means of the light sensors 48 and 49, whether or not the chamfer 28a of the fastener 28 is located suitably. In other words, in steps $S_4$ and $S_5$, the pneumatic spindle 24 is turned in steps until the light-receiving sensor 49 receives the light beams emitted from the light-emitting sensor 48, so that the horizontal latch pins 33 of the ring holder 30 are correctly positioned in the circumferential direction. If the result is affirmative in step $S_5$, i.e., if the ring holder 30 has been positioned properly, the operation proceeds to step $S_6$ where the arm reaches the second tool removing approach point $P_6$ through the first tool removing approach point $P_5$. The operation then proceeds to step $S_7$ where the polishing tool 35 is removed from the ring holder 30 at the tool removal stand 41. Namely, the ring holder 30, which is equipped with the polishing tool 35, is caused to enter the tool removal stand 41 through the point $P_7$ corresponding to the entrance. The ring holder 30 is then raised vertically upward from the point $P_8$ corresponding to the exit, whereby the polishing tool 35 is removed from the ring holder 30.

The operation then proceeds to step $S_8$ where the arm moves to the second horizontal rod correction approach point $P_{10}$ through the first horizontal rod correction approach point $P_9$. Furthermore, the arm is lowered in step $S_9$, whereby the leading end portion of the ring holder 30 is pressed against the horizontal rod adjusting stand 50 and the horizontal rod 32 together with the horizontal latch pin 33 is thus corrected for horizontality.

Then in step $S_{10}$, the arm moves to the tool mounting approach point $P_{12}$. In step $S_{11}$, the arm is lowered from above towards the leftmost polishing tool 35A in the tool stand 41, and the polishing tool 35A is mounted on the ring holder 30 at the tool mounting point $P_{13}$.

Then in step $S_{12}$, the arm moves downward to the tool mounting confirmation point $P_{14}$ through the light sensor detection approach point $P_2$. Then in step $S_{13}$, the pneumatic spindle 24 turns the rotary spindle member 25 in steps several times. Afterward, it is determined in step $S_{14}$, by means of the light sensors 48 and 49, whether or not the polishing tool 35 has been mounted. If the result is affirmative in step $S_{14}$, i.e., if it is confirmed that the polishing tool 35 has been mounted, the operation proceeds to step $S_{15}$ where the arm returns to the tool-exchange starting/ending point $P_1$. The tool-exchange process is thus terminated.

On the other hand, if the result is negative in step $S_{14}$ i.e., if the light sensors 48 and 49 cannot confirm that the polishing tool 35 has been mounted, the operation proceeds to step $S_{19}$ where the arm moves again to the tool positioning point $P_4$. Then in step $S_{20}$, the pneumatic spindle 24 turns the rotary spindle member 25 in steps. In step $S_{21}$, as in step $S_5$, the ring holder 30 and the horizontal latch pins 33 are positioned in the circumferential direction by means of the light sensors 48 and 49. If the ring holder 30 has been positioned properly, the operation proceeds to step $S_{22}$ where the arm moves to the second horizontal rod correction approach point $P_{10}$. In step $S_{23}$, the arm is lowered so that the leading portion of the ring holder 30 is press-fitted onto the horizontal rod adjusting stand 50. Thus, the horizontal rod 32 and the horizontal latch pins 33 are corrected for horizontality.

In the following step $S_{24}$, the arm moves to a spare tool mounting approach point (not shown). In step $S_{25}$, the arm and the ring holder 30 are lowered from above towards the polishing tool 35A', which is mounted on the ring holder 30 at the tool mounting point $P_{13}'$. In step $S_{26}$, the arm reaches the tool mounting confirmation point $P_{14}$ through the light sensor detection approach point $P_2$. Then in step $S_{27}$, the pneumatic spindle 24 turns the rotary spindle member 25 several times. It is then determined by means of the light sensors 48 and 49 in step $S_{28}$ whether or not the polishing tool 35A' has been mounted.

If the result is affirmative in step $S_{28}$, i.e., if it is confirmed that the spare polishing tool 35A' has been mounted, the operation proceeds to $S_{29}$ where the arm returns to the tool-exchange starting/ending point $P_1$. The tool-exchange process is thus terminated. On the other hand, if the result is negative, i.e., if it is not confirmed that the spare polishing tool 35A' has been mounted, the operation proceeds to step $S_{29}$ where the arm is temporarily stopped from being driven. In step $S_{30}$, the mounting operation of the polishing tool is performed manually. Then in step $S_{31}$ the driving of the arm is started again manually. The operation then proceeds to step $S_{15}$ where the arm returns to the tool-exchange starting/ending point $P_1$, and the operation of exchanging polishing tools is terminated.

In this manner, every time the polishing operation by means of a certain polishing tool 35 is terminated, the polishing tool 35 is automatically replaced with another polishing tool 35 according to a predetermined sequence. The polishing operation is thus performed, using the polishing tools 35A (35A') through 35F (35F').

In the embodiment described above, the multi-axis mold polishing robot 20 is constructed as a six-axis control robot, and the rotary spindle member 25 runs perpendicular to and along the curved work surface 62. However, the multi-axis mold polishing robot 20 may also be composed of a five-axis control robot that cannot change the orientation of the rotary spindle member 25 relative to the work surface. In such a five-axis control robot, as well as in the case where the work surface is generally flat, even if the work surface is slightly curved, no problem arises. This is because the polishing tool 35, which is coupled to the rotary spindle member 25 through the universal joint J, can move along the inclined surface (the work surface) quite stably.

Also, the ring holder 30 of the aforementioned embodiment is constructed such that the horizontal rod 32 and the horizontal latch pins 33 can be tilted with respect to the vertical rod 31. However, if the work surface of the mold is flat, the horizontal rod 32 and the horizontal latch pins 33 may be integrated with the vertical rod 31. In this case, although the horizontal rod 32 cannot be tilted with respect to the vertical rod 31, no problem arises.

Further, according to the previously described embodiment, the horizontal slot 47 of the tool removal stand 41 is designed to be tilted. However, the horizontal slot 47 may be arranged horizontally if it can be accepted that a relatively large force is required to remove the polishing tool.

As is apparent from the foregoing description, according to the mechanism for exchanging polishing tools in the mold polishing device of the present invention, the polishing tool can be mounted on and removed from the tool holder automatically with a simple structure. Accordingly, the time required to perform the mold polishing process can be shortened.

Further, the polishing tool can move along the work surface stably. Therefore, even if the work surface is slightly curved, a polishing operation can be performed with high precision.

Moreover, the horizontal latch pins can be press-fitted into and forcibly withdrawn from the notches smoothly. Thus, the polishing tool can be mounted on and removed from the ring holder with high reliability. As a result, the mold polishing process can be performed without any trouble.

Because the fastener is turned in steps together with the spindle, the chamfers, which are provided on the outer peripheral surface of the outer cylinder portion of the fastener, are detected by, for example, position detecting means that use light-emitting and light-receiving sensors. The tool holder is positioned such that the chamfers (the horizontal latch pins) correspond to the notches of the polishing tool in the tool stand and the horizontal slot of the tool removal stand. Hence, the horizontal latch pins can be press-fitted into and forcibly withdrawn from the notches smoothly. Consequently, the polishing tool can be mounted on and removed from the ring holder with high reliability.

Further in accordance with the invention, as the arm together with the ring holder is raised, the horizontal latch pins are forcibly withdrawn from the notches one after another. Thus, the polishing tool can be removed with a small force.

According to the method for automatically exchanging polishing tools in the mold polishing device of the present invention, the process of exchanging polishing tools can be performed automatically. Therefore, the time required to perform the mold polishing process is shortened. Further, it is not necessary for an operator to be continuously present at the polishing site while the mold polishing process is being carried out. Accordingly, the productivity in producing the mold can be enhanced. Especially, if the mold polishing process is performed during the night in an unattended situation, the productivity is enhanced significantly.

Still further according to the invention, prior to a polishing tool removing process, the horizontal latch pins can be positioned at positions corresponding to the horizontal slot of the tool removal stand and the notches of the polishing tool. Thus, a process of automatically exchanging polishing tools can be performed without difficulty, and the productivity of the mold producing operation is enhanced.

It should further be apparent to those skilled in the art that various changes in form and detail of the invention as shown and described above may be made. It is intended that such changes be included within the spirit and scope of the claims appended hereto.

What is claimed is:

1. A method for automatically exchanging polishing tools in a mold polishing device for polishing a work surface of a mold, wherein a polishing tool, which is mounted on a spindle provided at an arm of a multi-axis mold polishing robot and rotates together with said spindle, is pressed against and moved along said work surface for polishing said work surface, a T-shaped tool holder, which has a pair of left and right horizontal latch pins protruding from a vertical rod that is coaxially integrated with said spindle, is provided at a leading end portion of said spindle, said polishing tool is provided with a pair of notches allowing said horizontal latch pins to be engaged therewith in a press-fitted manner and to be forcibly withdrawn upward therefrom, a tool stand and a tool removal stand are provided in proximity to a mold setting area to which a mold to be polished is fixed, a plurality of polishing tools are arranged at predetermined intervals in said tool stand, with said notches of said polishing tools facing upward, and a horizontal slot, whose width is larger than an outer diameter of said vertical rod of said tool holder but smaller than an outer diameter of said polishing tool, is formed in said tool removal stand, comprising said steps of:

passing said horizontal latch pins upward from a lower portion of said horizontal slot of said tool removal stand so as to remove a used polishing tool from said tool holder; and subsequently press-fitting said horizontal latch pins from above into said notches of a predetermined one of said polishing tools in said tool stand so as to mount a new polishing tool to said tool holder.

2. The method according to claim 1, wherein said tool holder is solidly coupled to said spindle by means of a fastener, and a pair of chamfers, which correspond to said horizontal latch pins and are configured to indicate a circumferential position of the tool holder, are provided in an outer peripheral surface of an outer cylinder portion of the fastener, comprising the further steps of:

prior to a polishing tool removing process, turning said spindle in steps in a predetermined manner such that said outer cylinder portion of said fastener blocks a light path of light sensors for indicating a position of said tool holder; and circumferentially positioning said tool holder such that said chamfers assume a predetermined position that does not block said light path and said horizontal latch pins correspond in position to said horizontal slot of said tool removal stand and said notches of said polishing tool in said tool stand.

3. A method for automatically exchanging polishing tools in a mold polishing device for polishing a work surface of a mold, comprising the steps of:

(a) providing a plurality of polishing tools arranged at predetermined intervals on a tool stand, each of said polishing tools having a pair of notches formed in an upwardly directed end thereof;

(b) moving a spindle provided on an arm of a multi-axis robot into a position adjacent a selected one of said polishing tool, said spindle carrying a T-shaped tool holder having a pair of horizontal latch pins protruding therefrom;

(c) moving said spindle towards said selected one of said polishing tools to press-fit said horizontal latch pins into respective ones of said notches;

(d) moving said spindle with the selected one of said polishing tools attached thereto so as to press said polishing tool against a surface of a work surface to be polished, and then moving said spindle so as to polish said work surface with said selected one of said polishing tools;

(e) moving said spindle so as to move said selected one of said polishing tools to a tool removal stand and inserting said selected one of said polishing tool into a selected position on said tool removal stand;

(f) moving said spindle away from said selected one of said polishing tools to forcibly withdraw said horizontal latch pins from said notches; and (g) repeating steps (b) through (f) until a desired degree of polish of said work surface is attained.

4. The method for automatically exchanging polishing tools of claim 3, wherein polishing tools of successively finer grit are selected for each repetition of steps (b) through (f).

* * * * *